J. T. DAVIS.
DISTILLATION APPARATUS.
APPLICATION FILED MAY 8, 1911.
1,023,244.
Patented Apr. 16, 1912.
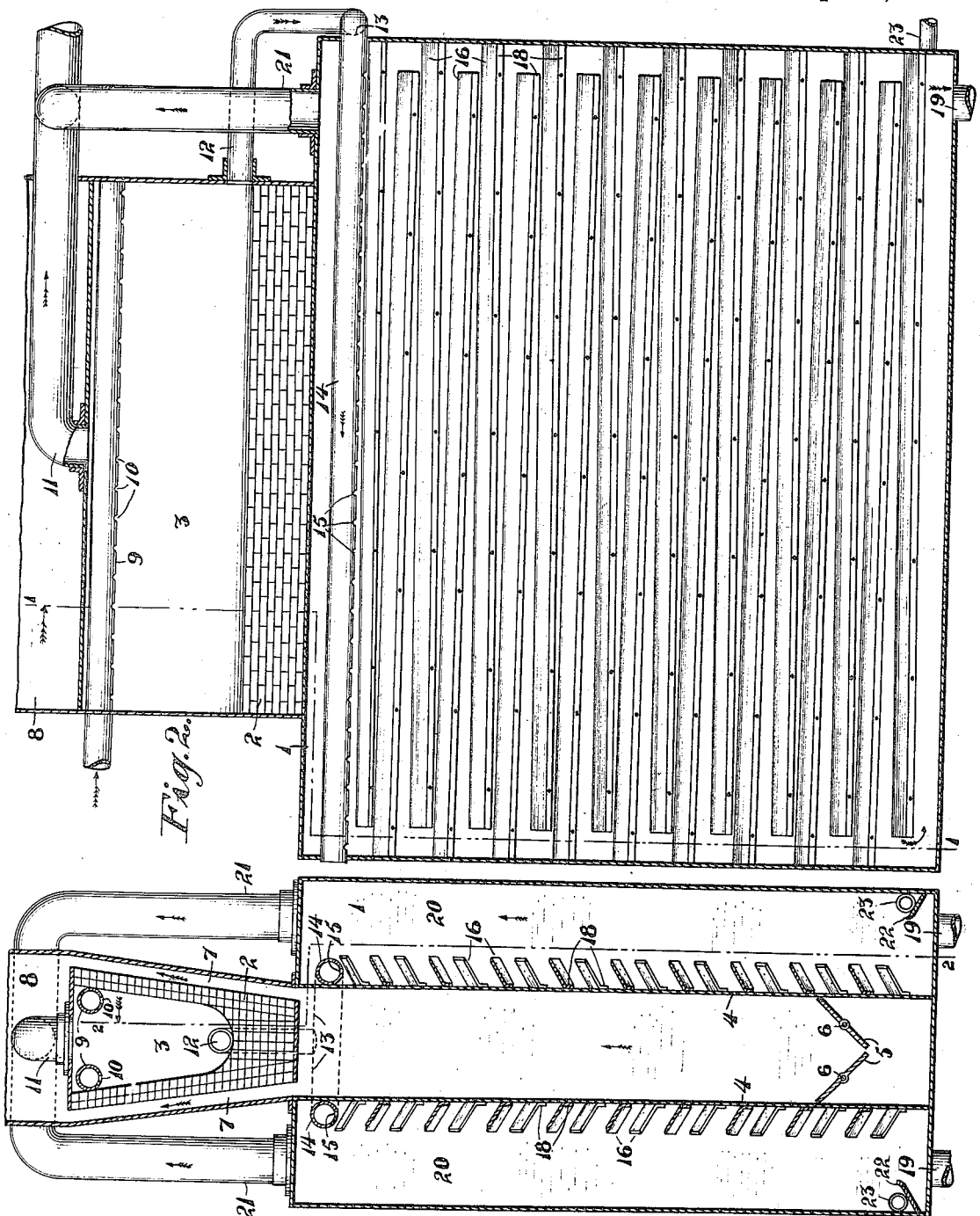
WITNESSES
F. C. Fliedner
N. B. Keating
INVENTOR
John T. Davis,
By F. M. Wright,
Atty.

UNITED STATES PATENT OFFICE.

JOHN T. DAVIS, OF ALAMEDA, CALIFORNIA, ASSIGNOR TO THE TECHNICAL DEVELOPMENT COMPANY, OF SAN FRANCISCO, CALIFORNIA, A CORPORATION OF ARIZONA.

DISTILLATION APPARATUS.

1,023,244.  Specification of Letters Patent.  Patented Apr. 16, 1912.

Application filed May 8, 1911. Serial No. 625,687.

*To all whom it may concern:*

Be it known that I, JOHN T. DAVIS, a citizen of the United States, residing at Alameda, in the county of Alameda and State of California, have invented new and useful Improvements in Distillation Apparatus, of which the following is a specification.

This invention relates to an improved apparatus for distilling alcohol, oil, or other liquids, the object of the invention being to provide apparatus of this character which will be simple in construction and convenient in use.

In the accompanying drawing, Figure 1 is a vertical cross section on the line 1—1 of Fig. 2; Fig. 2 is a vertical longitudinal section on the line 2—2 of Fig. 1.

Referring to the drawing, 1 indicates the body of my improved still, having at the top, inclosed in brick work 2 a vessel or trough 3 for the preliminary treatment of the liquid to be distilled, especially when crude oils are to be treated which have water mixed therewith. Hot products of combustion from a suitable furnace are led between parallel vertical walls 4 within the still and flow upward between said walls, the amount of hot products of combustion permitted to so pass upward being regulated by rotary dampers 5 on longitudinal shafts 6. The hot products of combustion escape at the top of the still by outlet passages 7 at the sides of the vessel 3, being conducted away by a suitable flue 8 the lower end of such flue only being here shown.

The liquid to be distilled is passed into pipes 9 in the upper portion of the vessel 3, and flows through small holes 10 in the lower sides of said pipes into said vessel. Any vapor, given off by the liquid in said vessel escapes by an outlet pipe 11. From the bottom of the vessel the liquid flows to a pipe 12 which connects with branch pipes 13 and longitudinal pipes 14, said longitudinal pipes being formed at the bottom with small holes 15. Said longitudinal pipes are arranged each above the first of a vertical series of troughs 16, said troughs being formed of strips of metal having flanges or bent portions 18 secured to said vertical walls 4, and upwardly and outwardly extending portions. The troughs connected to each wall slope downwardly in opposite directions alternately, the liquid being discharged from the lower end of each trough into the upper end of the trough immediately below it. From the lowermost trough, the liquid on each side runs into a conduit 19.

The walls 4 and troughs 16 are heated by the hot air passing upward between said walls, and the liquid in said troughs are partly vaporized by said heat, and the vapors are collected in the chambers 20 within the body of the still outside said walls 4 and are conducted by pipes 21 which connect with the pipe 11.

An important feature of my invention is that the oil flows in succession over a series of plates or troughs, gradually increasing in temperature.

22 indicates troughs to collect the liquids condensed from the vapors on the inside of the still and which are conducted by pipes 23 to be collected with other condensed vapors from the distillation to prevent them mixing with the residual or non-vaporizable liquid. This is important particularly in distilling oil from an asphaltic base since thereby a very pure asphalt results as the residuum of the distillation.

I claim:—

The combination of walls forming a conduit for products of combustion, a longitudinal vessel or trough between the upper portions of said walls, having inner sides converging downward, the outer sides of said trough being spaced from the said walls to permit the passage of products of combustion, said trough having a closed top, means for admitting oil into the upper portion of said trough, a pipe connected with the top of said trough for drawing off the oil vapor, a pipe connected with the bottom of said trough for drawing off the residual oil, a series of troughs secured to the outer side of the lower portion of each of the first-named walls, said series of troughs being arranged to permit a liquid to flow therein from the upper to the lower portion of said wall, means for conducting the oil from the first-named trough on to the upper of each series, walls forming with said first-named walls closed vapor chambers, and means for conducting off the vapor from said chambers.

In testimony whereof I have hereunto set my hand in the presence of two subscribing witnesses.

JOHN T. DAVIS.

Witnesses:
   FRANCIS M. WRIGHT,
   D. B. RICHARDS.